United States Patent [19]

Sticht

[11] Patent Number: 4,515,264
[45] Date of Patent: May 7, 1985

[54] ASSEMBLY LINE

[75] Inventor: Walter Sticht, Attnang, Austria

[73] Assignee: Stiwa-Fertigungstechnik Sticht Gesellschaft M.B.H., Attnang, Austria

[21] Appl. No.: 468,168

[22] Filed: Feb. 22, 1983

[30] Foreign Application Priority Data

Mar. 5, 1982 [AT] Austria .................................. 868/82

[51] Int. Cl.³ .............................................. B65G 37/00
[52] U.S. Cl. .................... 198/344; 198/345; 198/472; 198/580
[58] Field of Search ............... 198/472, 580, 344, 345; 269/56

[56] References Cited

U.S. PATENT DOCUMENTS 3,530,571 9/1970 Perry .............................. 198/472 X
4,444,303 4/1984 Burgess, Jr. ................... 198/472 X

FOREIGN PATENT DOCUMENTS 2518689 11/1976 Fed. Rep. of Germany ...... 198/472
2756422 6/1979 Fed. Rep. of Germany ...... 198/472

Primary Examiner—Jeffrey V. Nase
Attorney, Agent, or Firm—Kurt Kelman

[57] ABSTRACT

An assembly line with a succession of work stations for assembling, or working on, workpieces and parts, which comprises a conveyor for conveying pallets carrying the workpieces and parts along an elongated path to the succession of work stations, each pallet having a length extending in the direction of said path, the elongated conveyor path having two parallel path portions having respective center lines, the work stations having sides between the parallel path portions and extending in said direction and the conveyor being comprised of a conveyor section in each work station, each conveyor section having a length extending in the direction of the path, the two parallel conveyor path portions being spaced apart a distance corresponding substantially to the pallet and conveyor section lengths, and each work station being equipped with its own conveyor drive and manipulating devices for assembling, or working on, the workpieces and parts.

10 Claims, 10 Drawing Figures

ASSEMBLY LINE

BACKGROUND OF THE INVENTION

The present invention relates to improvements in an assembly apparatus with a succession of work stations for assembling, or working on, workpieces and parts.

Austrian Pat. No. 350,470 discloses such an apparatus wherein the work stations are interconnected modules forming a structural unit. Each work station is equipped with its own conveyor means for the workpieces and parts or for pallets carrying the same as well as manipulating means for assembling, or working on, the workpieces and parts at each station and, optionally, means for feeding the parts thereto. The length of the path of the conveyor means in each work station usually corresponds to a multiple of the length of the workpieces or pallets to be conveyed. The work stations may be so constructed or arranged that the conveyor means extend into two parallel paths. Transverse conveyors are arranged at head stations to transfer the workpieces or pallets from one conveyor means path to the parallel path. While such an assembly line has been quite successful in practice, it has not been possible to take into account, or take advantage of, all possibilities encountered in assembly operations.

SUMMARY OF THE INVENTION

It is the primary object of this invention to improve such an apparatus so that substantially all of the conveying path may be utilized for the assembly and work operations. Another object is an optimal space utilization for erecting the apparatus under different space conditions.

The invention accomplishes this and other objects with an assembly apparatus of the indicated type, which comprises a conveyor means for conveying pallets carrying the workpieces and parts along an elongated path to the succession of work stations, each pallet having a length extending in the direction of said path, the elongated conveyor means path having two parallel path portions having respective center lines, the work stations having sides between the parallel path portions and extending in said direction and the conveyor means being comprised of a conveyor means section in each work station, each conveyor means section having a length extending in the direction of the path, the two parallel conveyor means path portions being spaced apart a distance corresponding substantially to the pallet and conveyor means section lengths.

The surprising concept of the present invention resides in the selection of a distance between the two parallel conveying path portions of the work stations, which permits utilization of the end stations connecting the two parallel conveying paths for assembly work. Futhermore, such an assembly line has the advantage that, depending on local space availabilities, its dimension may be changed in any direction by the length of a conveyor means section, or a multiple thereof. This produces a particular advantage in the case of circular assembly lines normally used to accommodate to space limitations since additional work stations may be readily added anywhere along the conveying path. Also, the arrangement of manipulating devices and feed conveyors for the parts on both sides of the conveying path may be used in such apparatus even when erected in relatively tight spaces. This advantage is obtained because the transfer area between the two parallel conveyor means path portions can be utilized for at least one work station and the transfer of the pallets involves only the loss of the length of the pallet. At the same time, the distance between the two parallel conveyor means path portions, i.e. useless space, is held to a minimum.

BRIEF DESCRIPTION OF THE DRAWINGS

The above and other objects, advantages and features of the present invention will become more apparent from the following detailed description of certain now preferred embodiments thereof, taken in conjunction with the generally schematic drawing wherein.

DETAILED DESCRIPTION OF PREFERRED EMBODIMENTS

Figure 1:
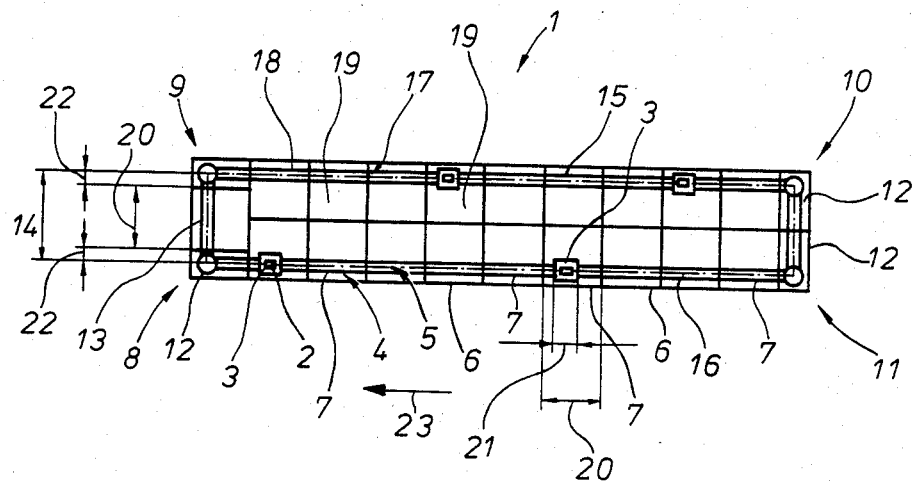
FIG. 1 is a diagrammatic and simplified top view of an assembly apparatus according to this invention.

Referring now to the drawing and first to FIG. 1, there is shown assembly apparatus 1 with a succession of work stations 6, 19 for assembling, or working on, workpieces and parts 2. The illustrated assembly apparatus comprises conveyor means 4 for conveying pallets 3 carrying the workpieces and parts along an elongated conveying path in the direction of arrow 23 to the succession of work stations 6, 19. Each pallet 3 has length 21 extending in the direction of the conveying path and the elongated conveyor means path has two parallel conveying path portions 5 and 17 having respective center lines 16 and 15. The work stations have sides 60 (FIG. 3) between the parallel conveying path portions and extending in this direction. Conveyor means 4 is comprised of a succession of conveyor means sections 7, 18 in the succession of work stations 6, 19, each conveyor means section having length 20 extending in the direction of the conveying path. Center lines 15, 16 of the two parallel conveyor means path portions 5, 17 are spaced apart a distance 14 corresponding substantially to pallet and conveyor means section lengths 20+21 (each illustrated distance 22 being half the distance 21). As is known and will be more fully described hereinafter, each work station is equipped with its own conveyor means drive means and manipulating means for assembling, or working on, the workpieces and parts.

As shown in FIG. 1, the succession of work stations comprises a connecting work station extending between the two parallel conveyor means path portions 5, 17, conveyor means section 13 in this connecting work station extending perpendicularly to the parallel conveying path portions. Pivotal conveyor means sections 12 are arranged between conveyor path portions 5 and 17 and conveyor means section 13 in the connecting work station at transfer areas 8 and 9, as well as at opposite transfer areas 10 and 11. The hereinabove described and illustrated spacing between the center lines of the two parallel conveying path portions provides an optimal use of the entire length of the conveyor means along the assembly line since even the transfer areas 8 to 11 may be utilized for working on workpieces or parts 2 on pallets 3. The arrangement of conveyor means section 13 in the connecting work station at an angle of 90° to the parallel conveying path portions makes it possible to use a simple programmed turning device for the pallet or workpiece for transferring the same between the successive conveyer means sections.

Figure 2:
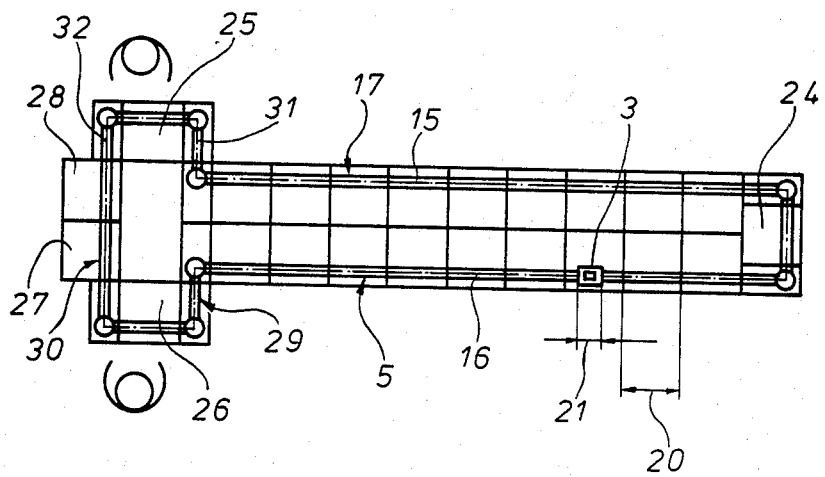
FIG. 2 is a similar view showing another embodiment of the apparatus.

As shown in FIG. 2, the spacing between the two parallel conveying path portions according to this invention makes it possible readily to enlarge the modular assembly line of FIG. 1 by adding five work station modules 24, 25, 26, 27, 28 within a minimal space. It is essential for this purpose to keep the distance between center lines 31, 32 of the two parallel conveyor means path portions 29, 30 to the same measurement as that between center lines 15, 16 of the two parallel conveyor means path portions 5, 17, i.e. length 20+21.

Figure 3:
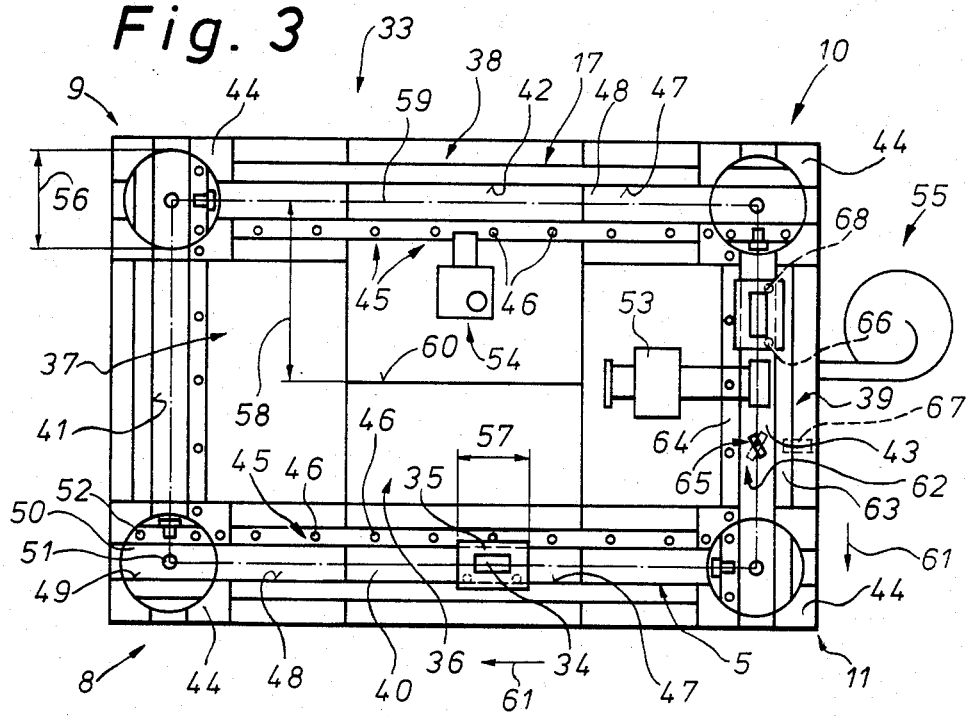
FIG. 3 is an enlarged top view showing some structural details of an assembly apparatus with several work stations.

FIG. 3 illustrates assembly apparatus 33 for assembling, or working on, workpieces or parts 34 carried by pallets 35. The apparatus comprises a succession of four work stations 36, 38 and connecting work stations 37, 39 and the conveyor means for conveying pallets 35 along an elongated path in the direction of arrow 61 to the succession of work stations is comprised of a succession of conveyor means sections 40, 42 forming two parallel conveying path portions and perpendicularly extending conveyor means sections 41, 43 in each work station. Areas 8 to 11 between the mutually perpendicular conveyor means sections have stations 44 for directing respective ones of pallets 35 therebetween. As shown, each work station is equipped with its own conveyor means drive means 45 for pallets 35 and this drive means includes rollers 46 spaced along the conveyor means sections. Conveyor means rollers 46 frictionally engage a side face of pallets 35 while idling rollers at the opposite pallet side face engage a guide face of the conveyor means opposite the rollers. In this manner, the pallet is securely held in position along the conveying path. Each station 44 has stationary conveyor means section 48 adjacent conveyor means section 40 and 42, respectively, and having substantially the same structure, and pivotal conveyor means section 49 constituted in the illustrated embodiment by turntable 50 which has center point 51 about which it is pivotal. Like the other conveyor means sections, section 49 has conveyor drive means 52 including rollers for conveying the pallets between the mutually perpendicular conveyor means sections. All the rollers are driven synchronously. Conveyor means sections 40, 48 and 42, 48 form two parallel conveying path portions 5 and 17 having respective center lines 59 and the center lines are spaced apart a distance corresponding substantially to the lengths of pallet 35 and the conveyor means sections in the work stations. This provides a very compact arrangement similar to a round table assembly line but which has the advantage that it is modular and may be readily enlarged.

As shown, the work stations are equipped with various manipulating means 53, 54 for assembling, or working on, workpieces or parts 34. Further, device 55 for feeding parts to the work stations is also provided.

Preferably, length 56 of pivotal conveyor means section 49 corresponds substantially to length 57 of the pallet. Furthermore, the work stations in the embodiment of FIG. 3 have width 58 between center line 59 of respective conveyor means path portions 5, 17 and a respective side 60 of the work station corresponding to about half the length of the conveyor means sections in the work stations. With this dimensioning, all work stations form a continuous work surface. Furthermore, keeping the length of transfer conveyor means sections 49 to that of pallets 35 limits the lost space of the assembly line at the transfer stations to a minimum. The space between the two parallel conveyor means path portions 5, 17 may be used fully for accommodating manipulating means 53, feed means 55 or controls by inserting the connecting work stations therebetween at the ends thereof. With the synchronously driven roller conveyor drive means described hereinabove, the pallets will not be subjected to additional acceleration when they are transferred between the stationary and pivoting conveyor means sections in the transfer areas. This will avoid jamming of the pallets.

FIG. 3 also shows pallet positioning means 62 for holding pallet 35 in a desired position in the work station. The illustrated pallet positioning means comprises a pivotal stop 65 mounted between guides 63, 64 of the conveyor means. In the pivotal position shown in full lines, stop 65 engages abutment pin 66 projecting downwardly from pallet 35 to prevent further movement of the pallet and to hold it in position. When the stop is pivoted by drive 67 into the position shown in broken lines, the conveyor drive means is able to advance the pallet until the stop engages trailing abutment pin 68 projecting downwardly from the pallet. This arrangement of a pivotal stop power-driven into two end positions for engagement with two abutment pins on the pallet enables pallet 35 to be held in two selected positions in the work station without requiring additional clamping means.

Figure 4:
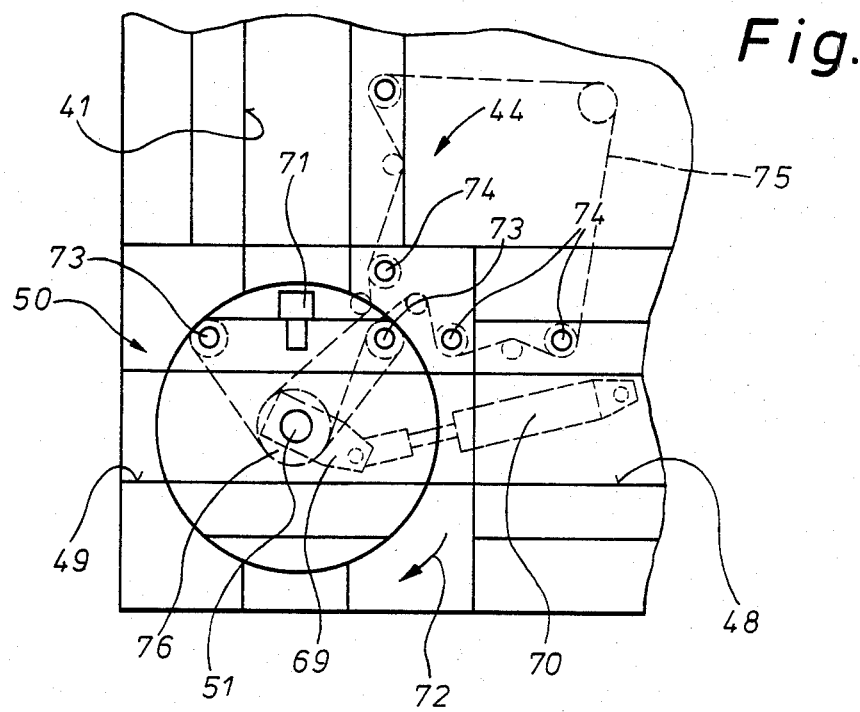
FIG. 4 shows a pallet pivoting area of the apparatus of FIG. 3 on an enlarged scale.

FIG. 4 shows pivoting conveyor means section 49 in detail. One end of pivotal lever 69 is keyed to a pivot pin at center 51 of turntable 50 and the opposite end of the pivotal lever is linked to a pivoting drive 70, which may be a pneumatically operated cylinder-piston device. Centering pin 71 is arranged to hold conveyor means section 49 on turntable 50 in respective alignment with adjacent stationary conveyor means section 48 and 41. By pivoting turntable 50 by drive 70 in the direction of arrow 72, the direction of rotation of rollers 73 of conveyor means drive means 52 will remain the same, regardless of whether the pivoting conveyor means section is in alignment with conveyor means sections 48 or 41. Therefore, common transmission belt or chain 75 is used for driving rollers 73 and rollers 74 of the conveyor means drive means of the stationary conveyor means sections. The transmission belt or chain may be driven by a central drive so that the rotary speed of all conveyor means drive rollers is the same, this avoids any jamming in the transfer stations. Transmission belt or chain 75 is trained over pinion 76 at center 51 of turntable 50 to receive the rotary motion of the turntable and rollers 73 mounted thereon.

Figure 5:
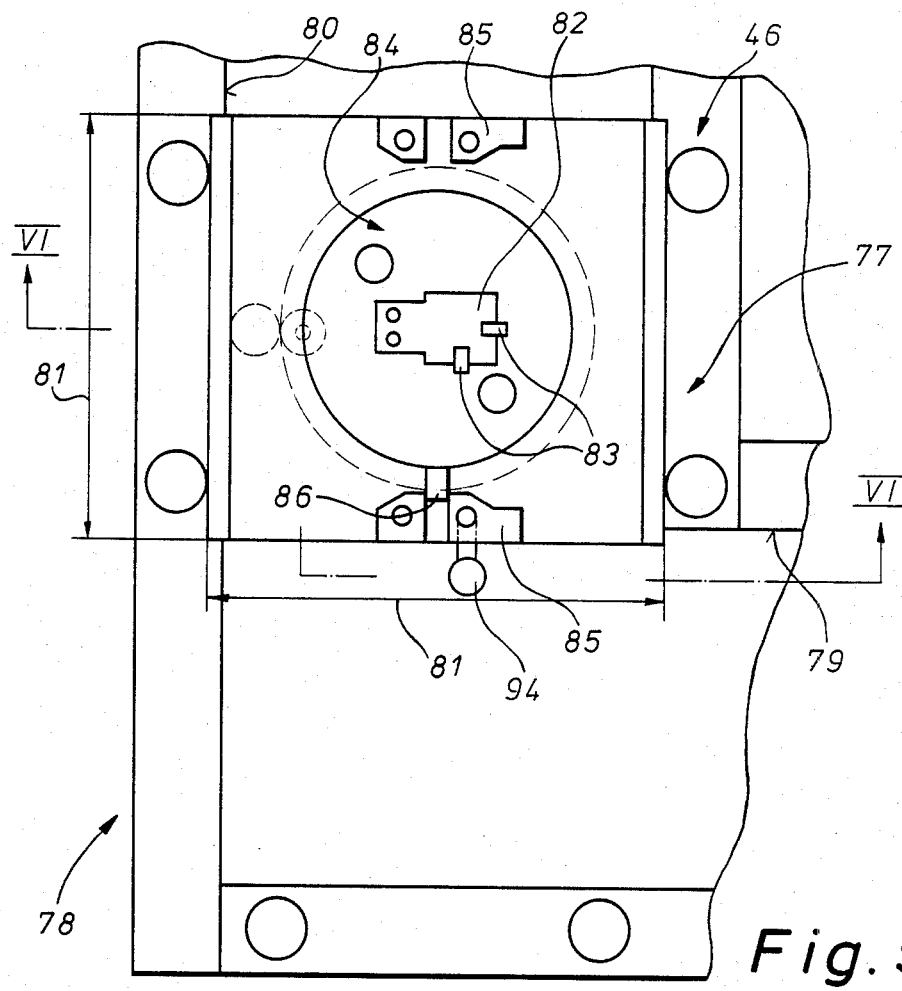
FIG. 5 is a similar view of another embodiment of a pallet pivoting area.
Figure 6:
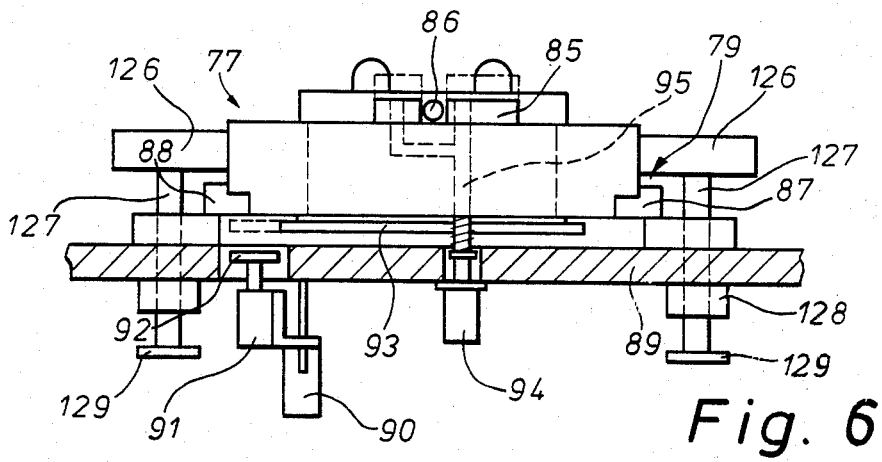
FIG. 6 is a section along line VI—VI of FIG. 5.

FIGS. 5 and 6 illustrate a transfer area 78 between conveyor means section 79 and conveyor means section 80 in a connecting work station extending between two parallel conveyor means path portions (of which section 79 is one while the other one is not shown in these figures), section 80 extending substantially perpendicularly to the parallel conveying path portions. Pallet 77 has a width 81 equal to length 81 thereof. The pallet is directed in transfer area 78 between mutually perpendicular conveyor means section 79, 80 by conveyor drive means 46 without changing its position. To enable workpiece or part 82 carried by pallet 77 to be suitably oriented for work or assembly in the connecting work station, workpiece or part holders 83 are mounted on turntable 84 arranged on the pallet. The turntable is held in the desired rotary position by abutment elements 85 on pallet 77 engageable by abutment pins 86 on turntable 84.

Pivoting of turntable 84 and the resultant positioning of workpiece 82 may be effected independently of the conveyance of pallet 77 in transfer area 78, for example along conveyor means section 79. In the illustrated embodiment, pivoting drive 91 is arranged for this purpose on module frame 89 between two lateral pallet guides 87, 88 of conveyor means section 79, the pivoting drive being mounted on jack 90 for vertical adjustment. Pivoting drive 91 comprises pinions 92 which may be moved by jack 90 from a lowered position shown in full lines in FIG. 6 to an upper position shown in broken lines, wherein the pinion engages annular rack 93. Adjustment drive 94 for abutment element 85 is actuated at the same time as jack 90 and push bolt 95 connects the adjustment drive to the abutment element so that the latter is lifted out of engagement with pin 86 (see position indicated in broken lines in FIG. 6), thus enabling drive 91 to pivot turntable 84 through engaged gear transmission 92, 93. A plurality of abutment elements 85 may be arranged on pallet 77 to enable turntable 84 to be fixed in a number of desired positions on the pallet so that the workpiece on the pallet may be suitably oriented.

Conveyor drive means 46 is constituted by rollers 126 rotating about vertical axis 127 at a substantially uniform rotary speed, driven sprockets 129 for rotating the rollers and slip clutch 128 arranged between the driven sprockets and the rollers. The distance between rollers 126 is less than length/width 81 of pallet 77.

This arrangement has the advantage that the workpiece or part may be positioned independently of the conveyor means for the pallet. The turntable can be used in the transfer area and has the added advantage of enabling heavy workpieces to be turned into different working positions at any work station. The gear transmission may be readily engaged and disengaged for pivoting the turntable. The spaced arrangement of the conveyor rollers makes access to the sides of the pallets possible, which facilitates the work in case of difficult assembly operations. At the same time, making this spacing shorter than the length of the pallet assures a smooth conveyance of the pallets.

Figure 7:
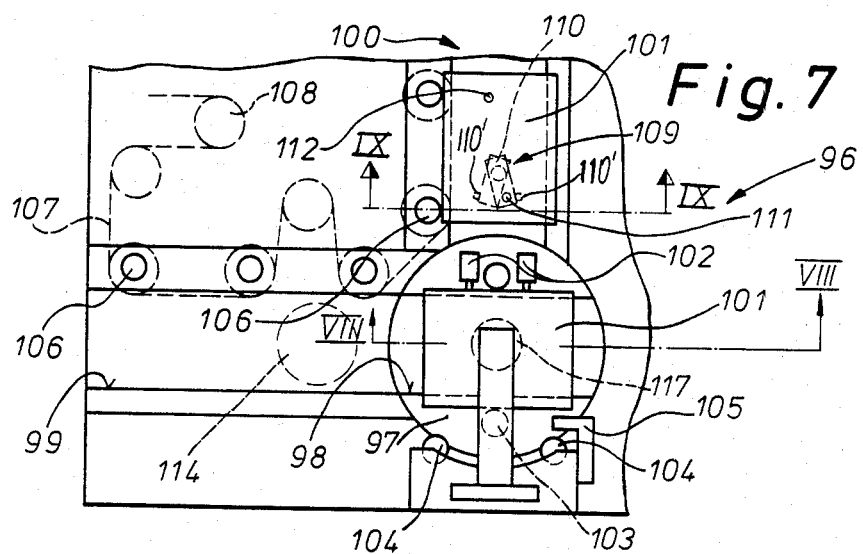
FIG. 7 illustrates still another embodiment of a pallet pivoting area.
Figure 8:
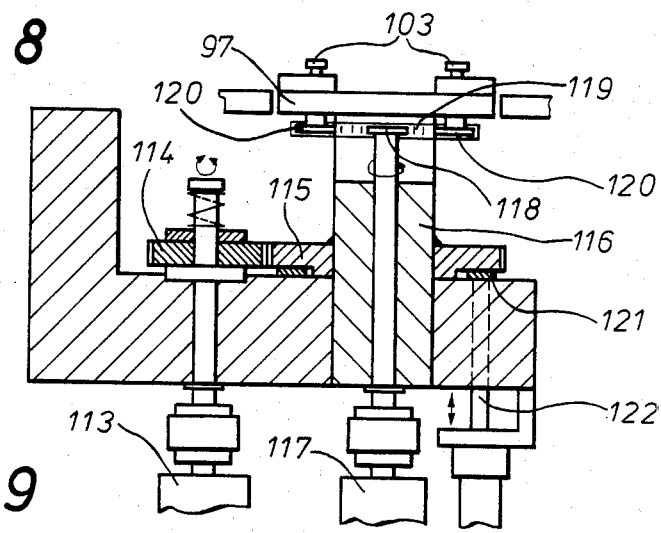
FIG. 8 is a section along line VIII—VIII of FIG. 7.

FIGS. 7 and 8 illustrate transfer area 96 comprising turntable 97 between mutually perpendicular conveyor means sections 99, 100. The turntable carries conveyor means section 98 respectively aligned with conveyor means section 99 or 100, depending on the rotary position of the turntable. Pallet 101 is held in fixed position on turntable 97 by clamping cylinders 102 when the turntable is pivoted. Conveyor rollers 103 convey the pallet on the turntable and from the turntable to the adjacent conveyor means section. Rollers 104 with limit switch arrangement 105 serve to define the end position of the pallet coming from conveyor means section 100.

Conveyor rollers 106 of conveyor means sections 99, 100 adjacent conveyor means section 98 on turntable 97 are driven synchronously by drive motor 108 connected to the conveyor rollers by transmission belt or chain 107.

As shown in FIG. 7, stop means 109 is arranged along the length of conveyor means section 110. The stop means comprises driven abutment lever 110 arranged for pivoting between two end positions, transversely to the conveying direction. Stops 110' in the pivoting path of the abutment lever determine the two end positions and two abutment bolts 111, 112 project downwardly from pallet 101, the abutment lever being arranged for engaging a respective abutment bolt in a respective end position thereof. This arrangement enables the pallet to be positioned in the work station at a desired location without additional control or monitoring devices, simply by adjusting the abutment lever position. If a plurality of adjacently arranged abutment bolts are provided and respective abutment levers are associated with each two such bolts, the abutment levers being spacedly arranged in, and transversely to, the conveying direction, multiple positioning of the pallet may be obtained in a very simple manner.

FIG. 8 illustrates drive motor 113 whose drive shaft carries pinion 114 coupled to annular ratchet 115 keyed to turntable 97. Ratchet 115 is mounted on journal 116 for a rotary shaft coupled to pivoting drive 117 and carrying pinion 118. Transmission chain 119 connects drive pinion 118 to driven pinions 120 of conveyor rollers 103. This drive makes it possible to rotate turntable 97 a full 360° in either direction while pallet 101 may be conveyed in any rotary position of the turntable by the conveyor means section of the turntable. The turntable is held in a desired rotary position by abutment 121 which is fixed in position by means of two parallel push rods 122 connected to a suitable vertical drive.

Figure 9:
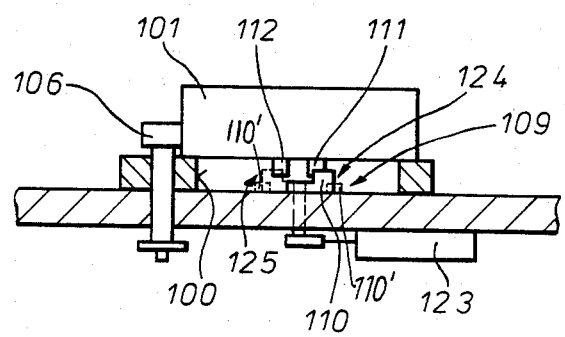
FIG. 9 is an end view, partly in section along line IX—IX of FIG. 7, of an arrangement for positioning a pallet

The operation of stop means 109 is illustrated in FIG. 9. Pivoting drive 123 is linked to abutment lever 110 to pivot the same into respective end positions 124 (shown in full lines) and 125 (shown in broken lines) in which the lever respectively engages abutment bolts 111 or 112.

Figure 10:
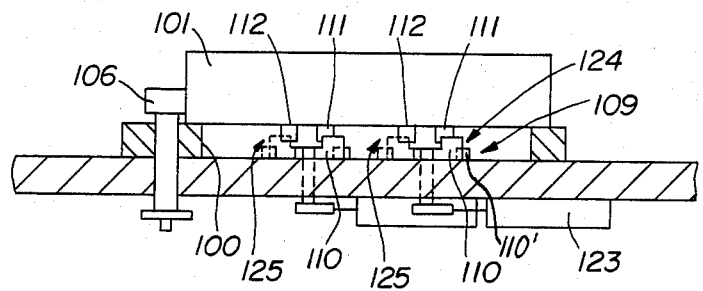
FIG. 10 shows the same view of a modification of the arrangement of FIG. 9.

In the modified arrangement of FIG. 10, the same reference numerals designate like parts to avoid redundancy in the description, the difference being that two abutment levers 110 are spacedly arranged in, and transversely to, the direction of the elongated conveying path. A plurality of adjacently arranged abutment bolts 111, 112 project downwardly from pallet 101 and each abutment lever is associated with two abutment bolts.

What is claimed:

1. An assembly apparatus with a succession of work stations for assembling, or working on, workpieces and parts, which comprises a conveyor means for conveying pallets carrying the workpieces and parts along an elongated path to the succession of work stations, each pallet having a length extending in the direction of said path, the elongated conveyor means path having two parallel path portions, a connecting path portion extending substantially perpendicularly to the parallel path portions and pivotal conveyor means sections arranged between the parallel and connecting path portions, the length of the pivotal conveyor means sections corresponding substantially to the pallet length, each work station being equipped with its own conveyor means drive means and manipulating means for assembling, or working on, the workpieces and parts, the pivotal conveyor means sections being equipped with conveyor means drive means constituted by conveyor rollers rotatable about a vertical axis, a pivoting drive for each one of the pivotal conveyor means sections, and motion-transmitting means connecting the conveyor rollers and the pivoting drive of each pivotal conveyor means section.

2. The assembly apparatus of claim 1, wherein the motion-transmitting means comprises driven sprockets for rotating the rollers and a slip clutch means arranged between the driven sprockets and the rollers.

3. The assembly apparatus of claim 1, wherein the conveyor means is comprised of a succession of conveyor means sections in the succession of work stations, each conveyor means section having a length extending in the direction of the path, each one of the pivotal conveyor means sections has a center point and is pivotal about the center point, the center points of two of said pivotal conveyor means sections aligned in the connecting path portion being spaced apart a distance corresponding substantially to the sum of the conveyor means section length and the pallet length.

4. The assembly apparatus of claim 1, wherein the pallets have a width equal to the length thereof, and further comprising a transfer area for the pallets between a respective one of the parallel and connecting path portions.

5. The assembly apparatus of claim 4, further comprising a turntable arranged on the pallet and workpiece or part holders mounted on the turntable.

6. The assembly apparatus of claim 1, wherein the work stations have a width between the center line of a respective one of the conveyor means path portions and a respective one of the work station sides corresponding to about half the length of the conveyor means sections.

7. The assembly apparatus of claim 1, further comprising a transfer area for the pallets between a respective one of the parallel and connecting path portions, the pivotal conveyor means sections comprising turntables arranged in the transfer areas, respective ones of the conveyor means sections in the parallel and connecting path portions adjacent the transfer areas being equipped with conveyor means drive means constituted by conveyor rollers rotatable about a vertical axis, and the conveyor rollers of the pivotal conveyor means sections and the sections adjacent thereto being driven substantially synchronously.

8. The assembly apparatus of claim 1, wherein the conveyor means sections are equipped with conveyor means drive means constituted by conveyor rollers rotatable about a vertical axis and the distance between the conveyor rollers is less than the length of the pallets.

9. The assembly apparatus of claim 1, further comprising stop means arranged along the length of a respective one of the conveyor means sections, the stop means comprising a driven abutment lever arranged for pivoting between two end positions transversely to said direction, stops in the pivoting path of the abutment lever for determining the two end positions, and two abutment bolts projecting downwardly from a respective one of the two abutment bolts in a respective one of the end positions.

10. The assembly apparatus of claim 9, wherein a plurality of adjacently arranged ones of said abutment bolts project downwardly from the pallet, a respective one of the abutment levers being assiated with each two bolts, and the abutment levers being spacedly arranged in, and transversely to, said direction.

* * * * *